US009128232B2

(12) United States Patent
McRae

(10) Patent No.: US 9,128,232 B2
(45) Date of Patent: Sep. 8, 2015

(54) METHOD AND APPARATUS FOR DIFFUSING LED LIGHT BULBS

(71) Applicant: Michael M. McRae, Ormond Beach, FL (US)

(72) Inventor: Michael M. McRae, Ormond Beach, FL (US)

(*) Notice: Subject to any disclaimer, the term of this patent is extended or adjusted under 35 U.S.C. 154(b) by 2 days.

(21) Appl. No.: 13/986,062

(22) Filed: Mar. 28, 2013

(65) Prior Publication Data
US 2014/0078749 A1    Mar. 20, 2014

Related U.S. Application Data

(60) Provisional application No. 61/685,951, filed on Mar. 28, 2012.

(51) Int. Cl.
F21V 21/00 (2006.01)
G02B 5/02 (2006.01)

(52) U.S. Cl.
CPC .......................... G02B 5/02 (2013.01)

(58) Field of Classification Search
USPC ............... 362/311.02, 558, 249.04, 555
See application file for complete search history.

(56) References Cited

U.S. PATENT DOCUMENTS 6,158,882 A * 12/2000 Bischoff, Jr. ................ 362/488
6,840,655 B2 * 1/2005 Shen ....................... 362/249.04
7,018,067 B2 * 3/2006 Wu ............................ 362/249.04
7,549,782 B2 * 6/2009 Ng et al. ....................... 362/555
7,850,341 B2 * 12/2010 Mrakovich et al. ...... 362/249.06
2008/0304280 A1 * 12/2008 Wu et al. ....................... 362/555
2008/0310183 A1 * 12/2008 Fan ............................... 362/555
2010/0181591 A1 * 7/2010 Suzuki ........................... 257/98
2013/0194811 A1 * 8/2013 Benitez et al. ............. 362/311.1
2013/0207534 A1 * 8/2013 Masuda et al. ............... 313/116
2013/0301130 A1 * 11/2013 Nakamura et al. ....... 359/493.01
2013/0313988 A1 * 11/2013 McRae ......................... 315/193
2014/0002771 A1 * 1/2014 Huang et al. .................. 349/64

* cited by examiner

Primary Examiner — Ali Alavi
(74) Attorney, Agent, or Firm — Brian K. Johnson, Esq., LLC; Brian K. Johnson

(57) ABSTRACT

An LED diffusion element is provided having at least one cavity for receiving an LED light bulb. The LED diffusion element contains a conditioned surface on both its exterior surface and in a light collection area that is facing the LED light bulb when inserted into the LED diffusion element. In one aspect, the LED diffusion element has an "H-shaped" cross section formed by the two cavities created on opposite sides of the LED diffusion element. In this configuration a common, central light collection area within the LED diffusion element is created that allows for smooth blending of colors coming from multiple LEDs contained within the two LED bulbs. In another aspect, the LED diffusion element is cylindrical in shape and is dimensioned to fit within a light rope so as to provide a smooth lighting effect when the LEDs are illuminated within the light rope.

20 Claims, 3 Drawing Sheets

METHOD AND APPARATUS FOR DIFFUSING LED LIGHT BULBS

CROSS REFERENCE TO RELATED APPLICATIONS

This application claims priority to and the benefit of U.S. Provisional Patent Application No. 61/685,951 filed Mar. 28, 2012 titled "Method and Apparatus for Diffusing LED Light Bulbs" which is incorporated by reference herein in its entirety.

STATEMENT REGARDING FEDERALLY SPONSORED RESEARCH OR DEVELOPMENT

Not applicable.

BACKGROUND OF THE DISCLOSURE

1. Field of the Invention

The present invention is directed to a LED light diffuser for both smoothing, enhancing and amplifying the light emitted by an LED bulb. The LED diffuser of the present application has a particularly advantageous application to rope lighting used within lighted holiday displays.

2. Description of the Prior Art

Low voltage, low power LED light strings are becoming increasingly popular in holiday decorations. These light strings often contain numerous LEDs which emit a strong, unsmoothed point source of light from the LED. Further, a plurality of LEDs are often illuminated simultaneously in order to obtain certain display colors within holiday decorations. Purple, in particular, is a difficult color to reproduce with LEDs since it requires a smooth blending of blue and red. Under most conditions, it is desirable to create a smooth lighting effect with these LEDs that is pleasing to the eye, particularly when used on holiday decorations such as displays and rope lights.

To date, no commercially available LED light diffuser has been provided that simultaneously increases light efficiency, diffuses the light emitted by the LED(s) and is configured to be incorporated within holiday rope lights.

SUMMARY OF THE INVENTION

In one preferred embodiment of the invention, a LED diffusion element is provided including a body having at least one cavity for receiving an LED bulb, the body containing wiring channels for containing wiring used to provide power to the LED bulb, the body further having a first conditioned surface at a light collection area of the cavity and a second conditioned outer surface, both of the first and second conditioned surfaces increasing a diffusive quality of the light provided by the LED bulb through the LED diffusion element. In additional aspects, the LED diffusion element further comprising a second cavity for receiving a second LED bulb, the LED bulbs being disposed within the cylindrical body such that the light collection areas of the two cavities are proximate to one another; and/or the body is cylindrical in shape and has an "H-shaped" axial cross section; and/or the conditioned surfaces are ridged.

In another preferred embodiment a LED diffusion element is provided comprising: a cylindrical body having two cylindrical cavities, the cylindrical cavities disposed at the two ends of the cylindrical body, each cylindrical cavity housing a cylindrically-shaped LED bulb in which an open end of the bulb is disposed toward the center of the cylindrical body so that the light from the LEDs is provided at a collection area within the LED diffusion element, the body further having a first conditioned surface at the light collection area of the cavity and a second conditioned outer surface, both of the first and second conditioned surfaces increasing a diffusive quality of the light provided by the LED bulb through the LED diffusion element. In other aspects, the conditioned surfaces are ridged; and/or the cylindrical body includes wiring channels for containing wiring used to provide power to the LED bulbs.

In yet another preferred embodiment, a light rope display is disclosed including a plurality of LED diffusion elements, each including a cylindrical body having two cylindrical cavities, the cylindrical cavities disposed at the two ends of the cylindrical body, each cylindrical cavity housing a cylindrically-shaped LED bulb in which an open end of the bulb is disposed toward the center of the cylindrical body so that the light from the LEDs is provided at a collection area within the LED diffusion element, the body further having a first conditioned surface at the light collection area of the cavity and a second conditioned outer surface, both of the first and second conditioned surfaces increasing a diffusive quality of the light provided by the LED bulb through the LED diffusion element.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, in which.

DETAILED DESCRIPTION

Those of skill in the art will appreciate that while the description provided below specifically recites LED light bulbs, the general teachings of the invention are applicable to other light string systems using other types of light strings, such as incandescent bulbs, phosphorescent bulbs, luminescent bulbs, and other electric bulbs. Further, it is noted that other light bulb types and lighting technologies may require modification so as to function properly in connection with the present invention.

Figure 1A:
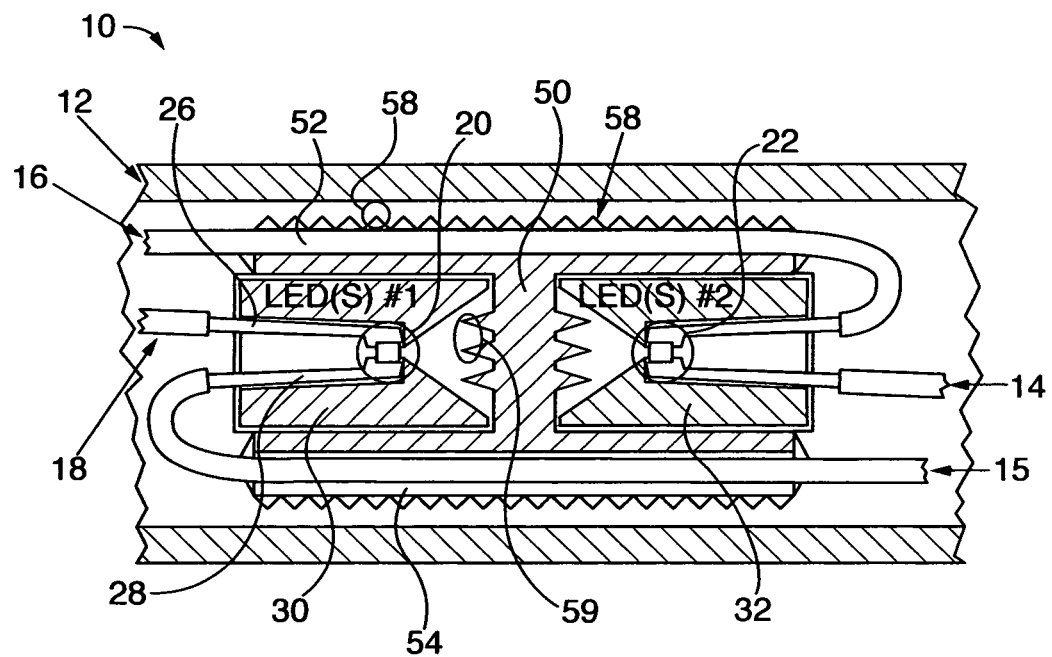
FIGS. 1A and 1B show cross sectional side view and end views respectively of an LED diffusion element included within a rope light according to one embodiment of the present invention.

FIG. 1A provides a cross sectional side view of a light rope 10 having external clear tubing 12 in which is contained a series of LED light bulbs 30 and 32 and LED diffusion element 50. Clear tubing 12 is typically made of a hard plastic or rubber to contain the LED-related structures and protect them from the external elements.

The LED(s) 20 and 22 within LED bulbs 30 and 32 are powered at their source by connections 16 and 18 that come from previous LED light bulbs within the light rope. Under proper applied voltage conditions, the actual LEDs within the bulbs will be biased and current will flow through them and out to destination connections 14 and 15. It should be clear that multiple LEDs, possibly of different color, may be contained within a single LED bulb 30 or 32. With the configuration provided in FIG. 1A containing two source and destination leads, four LEDs, each of a different color, may be present within the LED diffusion element 50—two within LED bulb 30 and two within LED bulb 32. When connected anode-to-cathode within each bulb, one LED from each of the LED pairs will illuminate when one polarity of voltage is applied at source connections 16 and 18. Switching that voltage polarity will illuminate the other pair within LED bulbs 30 and 32. If the LED bulbs only contain one LED 20 or 22, then only one LED would light within each group under appropriate biasing conditions.

Figure 3:
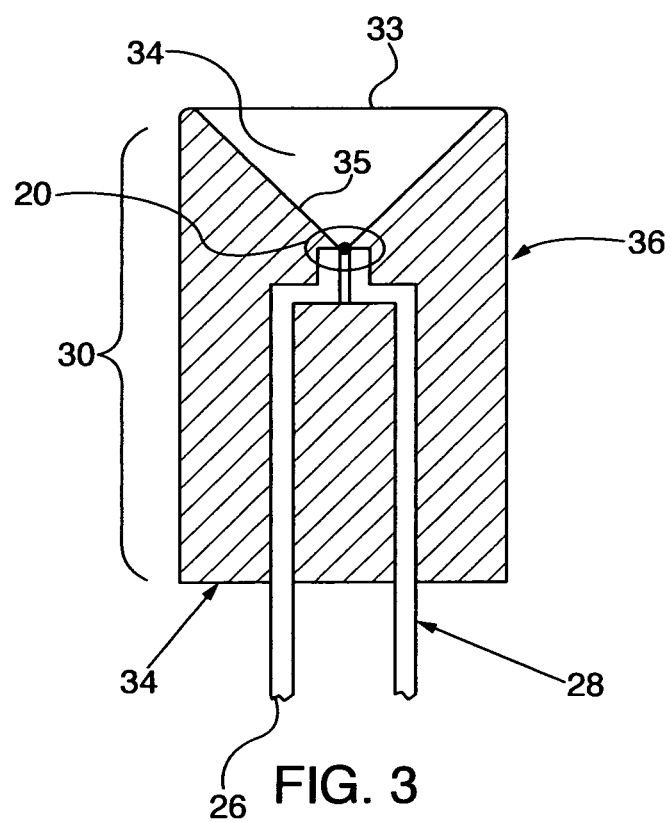
FIG. 3 shows cross sectional side view of an LED bulb according to another aspect of the present invention.

The LED bulbs themselves are constructed of hard plastic or other suitable mounting material for the LEDs within. The purpose of LED bulb 30 is to provide a solid structure within which to hold or encase the LED(s) and their delicate leads. As show in FIG. 3, LED bulb 30 encases the LED bulb leads 26 and 28 as well LED 20. Open conical volume 34 is provided within the LED bulb 30 to allow for LED light to be effused from the LED in a controlled manner. The side 35 of the conical region 34 provides somewhat of a reflective surface so that more of the illumination emanating from the LED makes it out of the end 33 of the LED bulb and thereon out the rope light 10. To further optimize the light generation capabilities provided by one or more of the LED(s), a black end coating or cap 34 can be provided at or applied to the base of the LED bulb 30. Further, a silver or other reflective coating 36 may be applied to the outer surface of the LED bulb 30 so as to reflect all the illumination within the LED bulb 30 and force it to exit out of conical volume 34 at bulb end 33.

Figure 1B:
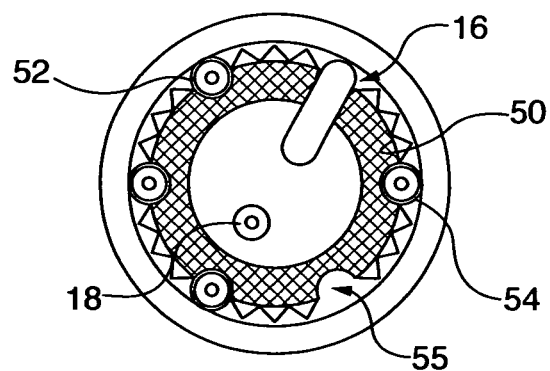

Referring back to FIG. 1A, LED diffusion element 50 is shown as a cylindrical structure having an "H-shaped" cross sectional side view. A cross sectional left end view of the light rope 10 taken through the LED diffusion element 50 is shown in FIG. 1B. As shown in both FIGS. 1A and 1B, the LED diffusion element contains wiring channels 52 and 54 through which the wiring going to the source and destination connections may be passed so as to provide a conduit within the LED diffusion element 50 and light rope 10. These channels may be physically drilled or formed as holes within the LED diffusion element 50, or alternatively they may be grooves 55 formed within the outer surface of the LED diffusion element.

The LED diffusion element can be either opaque or clear depending on the desired optical effects to be produced. Through proper selection of the LED diffusion element material, the diffusion element itself provides some of the LED smoothing effects. In this regard, LED light is collected at the part of the LED diffusion element in proximate relation ("collection area") with the LED bulb end 33 and is channeled throughout the LED diffusion element. In addition, ridges may be provided in certain locations to enhance the diffusive effect of the LED diffusion element. First, ridges 58 may be provided along the outer surface of the LED diffusion element. These ridges provide multidirectional surfaces from which the LED light may exit the LED diffusion element, thereby providing a more diffusive quality to the element as LED light escapes it. Ridges 58 also serve to provide mechanical stability within the light rope 10 by providing a gripping function with respect to the inside wall of the light rope so as to secure the LED diffusion element in one location. Second, ridges 58 may be provided at the inner cross portion of the "H"-shaped cross section, i.e. the collection area opposite the light bulb end 33, to perform the same diffusive function. Other surfacing enhancing techniques and conditioning may also be applied, in addition to or instead of ridges, to the indicated areas of the LED diffusion element so as to provide any intended diffusive effect. In one particularly important aspect, light collection surfaces 59 are positioned within the light collection area and adjacent to one another within the LED diffusion element and are conditioned to collect the maximum amount light from the respective cavities 56 in which the LED bulbs reside. In practice, these conditioned "collection areas" that are in direct optical contact with the emitted LED light may include a variety of surface configurations (i.e. a reverse cone, a lens etc.) that will enhance the LED light collection and allow the emitted LED light to blend smoothly within the LED diffusion element.

Figure 2A:
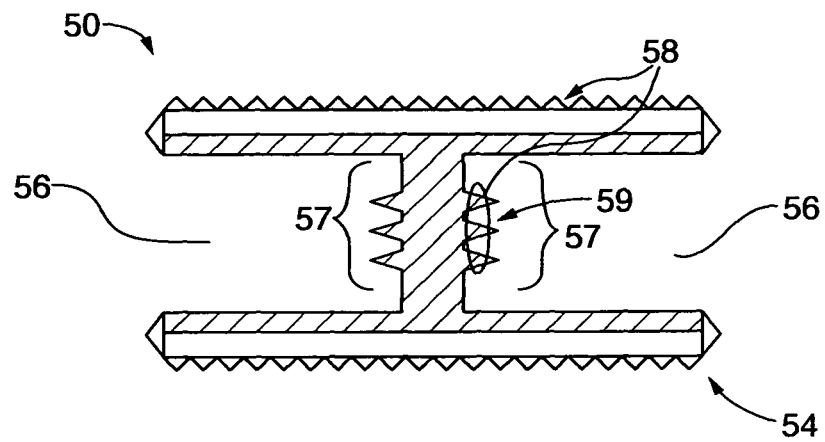
FIGS. 2A and 2B show cross sectional and end views respectively of an LED diffusion element according to one embodiment of the present invention.
Figure 2B:
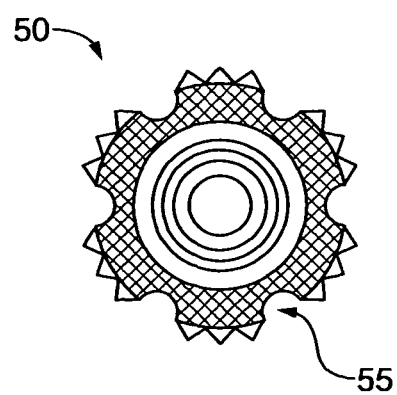

FIGS. 2A and 2B provide cross sectional side view and end views respectively of the LED diffusion element 50. Ridges 58, wiring groove 55, collection surface 59 within collection area 57 and cavities 56 are all shown.

Although various embodiments, which incorporate the teachings of the present invention have been shown and described in detail herein, those skilled in the art can readily devise many other varied embodiments that still incorporate these teachings.

What is claimed is:

1. An LED diffusion element comprising:
a solid body, said solid body having an axis, said LED diffusion element having at least one cavity disposed on said axis of said diffusion element, said cavity housing a an LED bulb, said LED bulb providing illumination toward a collection area within said LED diffusion element, said diffusion element further having a first conditioned surface at said light collection area of said cavity and a second conditioned surface at an outer surface of said LED diffusion element, said outer surface of said LED diffusion element being disposed toward an inner surface a light string system, said first and second conditioned surfaces diffusing the light provided by each of said LED bulbs.

2. The LED diffusion element of claim 1 further comprising a second cavity for receiving a second LED bulb, said LED bulbs being disposed within said cavities within said solid body such that said light collection areas of said two cavities are proximate to one another.

3. The LED diffusion element of claim 2 wherein the solid body is a cylinder and an axial cross section of said cylinder is "H-shaped".

4. The diffusion element of claim 2 wherein said LED bulbs are different colors.

5. The LED diffusion element of claim 1 wherein one of said first and second conditioned surfaces includes ridges.

6. The LED diffusion element of claim 1 wherein said LED diffusion element includes a source connection and a destination connection, said LED bulb coupled to said source and destination connections at a pair of LED leads, said source and destination connections providing power to said LED bulb.

7. The LED diffusion element of claim 6 wherein said solid body includes a wiring channel for containing wiring used to couple said source connection and said destination connection to said pair of said LED leads.

8. A lighted holiday display comprising:
an external housing;
a plurality of LED diffusion elements, each of said LED diffusion elements having a rectangular solid body, said plurality of LED diffusion elements disposed within said external housing, each of said LED diffusion elements having at least one cavity disposed within said diffusion element, said cavity housing an LED bulb, said LED bulb providing illumination toward a collection area within said LED diffusion element, said diffusion element further having a first conditioned surface at said light collection area of said cavity and a second conditioned surface at an outer surface of said LED diffusion element, said outer surface of said LED diffusion element being disposed toward an inner surface of said external housing, said first and second conditioned surfaces diffusing the light provided by each of said LED bulbs.

9. The lighted display of claim 8 wherein said LED diffusion elements have at least two of said cavities, each cavity disposed at each end of said cylinder, said LED bulbs being disposed within said cavities such that said light collection areas of said two cavities are proximate to one another.

10. The lighted display of claim 9 wherein said LED bulbs are different colors.

11. The lighted display of claim 8 wherein said plurality of said source lead each of said LED diffusion elements includes at least one source connection and at least one destination connection, said LED bulb coupled to said source and destination connections at a pair of LED leads, said source and destination connections providing power to said LED bulb.

12. The lighted display of claim 11 wherein each of said LED diffusion elements includes at least one wiring channel within LED diffusion element, said wiring channel containing wiring coupling said source and destination connections to said LED leads.

13. The lighted display of claim 8 wherein each of said first and second conditioned surfaces include ridges.

14. A light rope display comprising:
   an external tubing, said tubing being hollow along an axis;
   a plurality of LED diffusion elements, each of said LED diffusion elements having a central axis, said plurality of LED diffusion elements disposed within said hollow tubing and said central axis of said LED diffusion elements disposed coaxially with said axis of said hollow portion of said external tubing, each of said LED diffusion elements having at least one cavity disposed on said axis of said diffusion element, said cavity housing a an LED bulb, said LED bulb providing illumination toward a collection area within said LED diffusion element, said diffusion element further having a first conditioned surface at said light collection area of said cavity and a second conditioned surface at an outer surface of said LED diffusion element, said outer surface of said LED diffusion element being disposed toward an inner surface of said external tubing, said first and second conditioned surfaces diffusing the light provided by each of said LED bulbs.

15. The light rope display of claim 14 wherein said LED diffusion elements are cylinders, said axis of said cylinders being disposed coaxially with said axis of said hollow portion of said external tubing.

16. The light rope display of claim 15 wherein said LED diffusion elements have at least two of said cavities, each cavity disposed at each end of said cylinder, said LED bulbs being disposed within said cavities such that said light collection areas of said two cavities are proximate to one another.

17. The light rope display of claim 16 wherein said LED bulbs are different colors.

18. The light rope display of claim 14 wherein said plurality of said source lead each of said LED diffusion elements includes at least one source connection and at least one destination connection, said LED bulb coupled to said source and destination connections at a pair of LED leads, said source and destination connections providing power to said LED bulb.

19. The light rope display of claim 18 wherein each of said LED diffusion elements includes at least one wiring channel within LED diffusion element, said wiring channels containing wiring coupling said source and destination connections to said LED leads.

20. The light rope display of claim 14 wherein each of said first and second conditioned surfaces include ridges.

\* \* \* \* \*